Feb. 9, 1954     C. O. SCHMIDT, JR     2,668,321
SAFETY DEVICE FOR STUFFING APPARATUS
Filed March 8, 1951     2 Sheets-Sheet 1
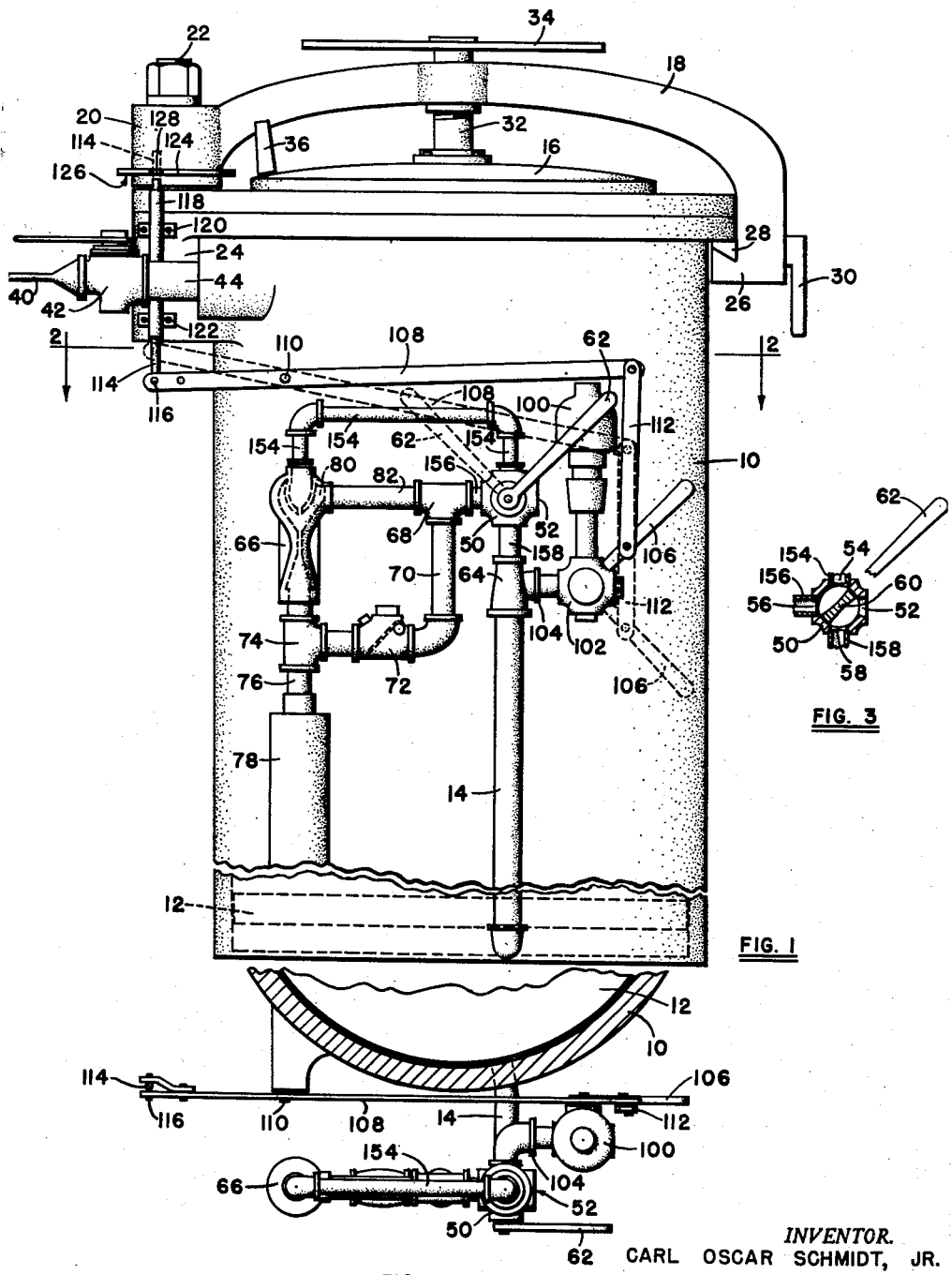
INVENTOR.
CARL OSCAR SCHMIDT, JR.

Feb. 9, 1954 C. O. SCHMIDT, JR 2,668,321
SAFETY DEVICE FOR STUFFING APPARATUS
Filed March 8, 1951 2 Sheets-Sheet 2
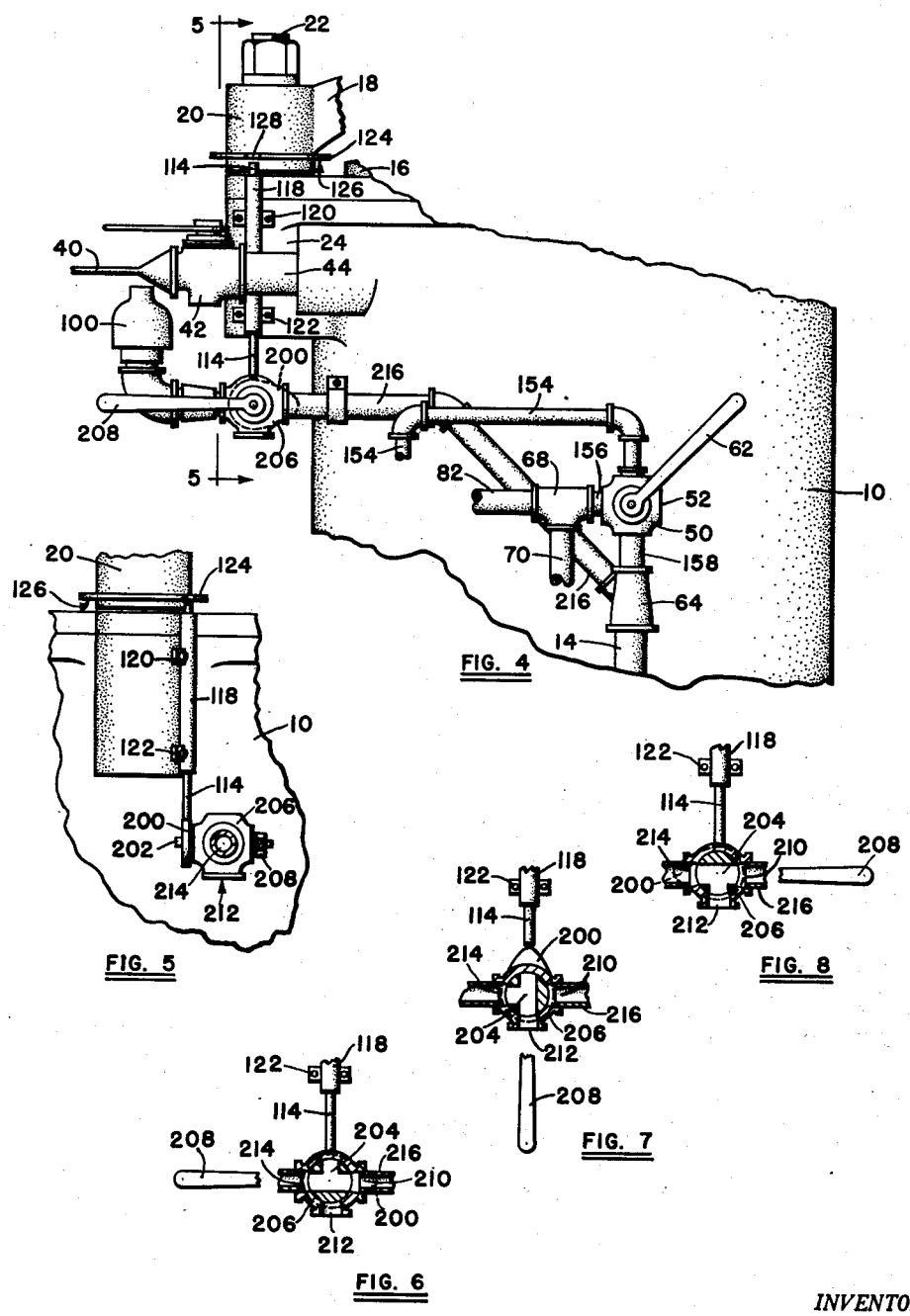
INVENTOR.
CARL OSCAR SCHMIDT, JR
BY
*J. Warren Kinney, Jr.*
ATTORNEY Patented Feb. 9, 1954

2,668,321

UNITED STATES PATENT OFFICE 2,668,321

SAFETY DEVICE FOR STUFFING APPARATUS

Carl Oscar Schmidt, Jr., Cincinnati, Ohio, assignor to The Cincinnati Butchers' Supply Company, Cincinnati, Ohio, a corporation of Ohio Application March 8, 1951, Serial No. 214,521

3 Claims. (Cl. 17—39)

1

This invention relates to fluid-pressure-operated stuffing apparatus and more particularly to a safety attachment for such apparatus.

An object of the invention is to provide a safety device for fluid-pressure-operated stuffing apparatus of the type utilized in the meat-packing industry for filling sausage casings and the like with meat products, which device is constructed and arranged in such a manner as to preclude its being rendered ineffective by an operator desiring to operate the device without the benefit of my safety means.

Another object of the invention is to provide a safety attachment for an air stuffer of the type which includes a cover-carrying yoke fulcrumed to an open-topped cylinder, which includes means for securely though releasably locking the yoke against relative motion with the cylinder when it has been swung into position for disposing the cover in closed position, that is, in axial alignment with the cylinder, thereby positively locking the yoke in a closed-cover position.

A further object of the invention is to provide a safety attachment which is constructed and arranged in such a manner as to be easily affixed to existing air stuffers with a minimum of effort and expense.

Still a further object of the invention is to provide a safety attachment for air stuffers which includes a pressure relief valve connected through a manually operable valve for isolation from or in open communication with the interior of the cylinder of the air stuffer, whereby the maximum pressure developed within the cylinder will, during those periods of time when the relief valve is in open communication therewith, be limited to a predetermined value of such magnitude as to preclude rapid movement or acceleration of the piston while the cover is in open position. In this connection it will be noted that many serious injuries have occurred in the meat processing industry when the operators of air stuffers have applied full-line pressure to a temporarily stuck piston while the cover of the stuffer is open, with the result that the piston when loosened from its previously stuck condition is rapidly propelled or projected upwardly with such speed and force as to be bodily discharged from the open end of the cylinder, damaging any and all objects in its path.

2

Another object of the invention is to provide a simple yet highly effective safety attachment fabricated from standard parts which when combined in the manner disclosed will provide a highly effective, foolproof safety attachment which will preclude the accidental or unintentional application of full-line pressure to the cylinder during those periods of time when the cover member is in other than fully closed position.

These and other objects are attained by the means described herein and as disclosed in the accompanying drawings in which Fig. 1 is a front elevation of an air stuffer embodying the safety attachment of the present invention.

Fig. 2 is a partial sectional view taken on line 2—2 of Fig. 1.

Fig. 3 is a partial sectional view of the valve 50 of Fig. 1.

Fig. 4 is a partial elevational view of an air stuffer disclosing a modification of the present invention.

Fig. 5 is a view on line 5—5 of Fig. 4.

Fig. 6 is a vertical section through valve 206 of Figs. 4 and 5.

Figs. 7 and 8 are views similar to Fig. 6 wherein the valve is disposed in different operative positions.

With reference now to Fig. 1, the numeral 10 denotes generally a conventional air-stuffer cylinder open at its upper end and having a closed bottom. The numeral 12 denotes a piston mounted for reciprocable axial movement within the cylinder in response to the application of fluid pressure to the bottom of the cylinder beneath piston 12 via pipe 14.

Access to the interior of cylinder 10 is controlled by means of a cover 16 secured to and carried by yoke 18 fulcrumed as at boss 20 to pivot bolt 22 projecting upwardly from boss 24 of cylinder 10. The yoke is thus horizontally swingable about or with reference to the upper open portion of the cylinder for disposing cover 16 in open or closed relationship relative to the cylinder, it being noted that when the cover has been disposed in a closed position it will be in axial alignment with cylinder 10.

That end of yoke 18 remote from boss 20 may terminate in a member 26 dimensioned to lockingly engage a complementary portion 28 secured to and carried by the upper portion of the cylinder. A suitable locking lever 30 may be provided for securely though releasably fastening the yoke in the cover-closing position illustrated in Fig. 1.

Vertical movement may be imparted to cover 16 by means of a clamping screw 32 the upper end of which terminates in a hand wheel 34. Relative rotation of cover 16 with yoke 18 may be effectively precluded by means of an upwardly extending bracket 36 secured to and carried by cover 16 and provided with a pair of laterally spaced elements dimensioned to spanningly engage opposite sides of the yoke.

The contents of cylinder 10 are normally adapted to be extruded through one or more nozzles 40 incident to elevation of piston 12. The flow of material through nozzles 40 may be controlled by means of suitable cocks 42 in communication with the upper portion of the cylinder via conduits 44.

If desired, the pressure media utilized to actuate the piston may be air suitably introduced to control valve 50 which may be of the so-called four-way type having inlet port 52 and discharge ports 54, 56 and 58. As illustrated in Fig. 3, the interior of valve 50 is provided with a rotatable plug 60 movable by means of handle 62 to various relationships with respect to the inlet and outlet ports. When the handle is in the position illustrated in solid outline in Fig. 1, plug 60 will be located whereby to connect inlet port 52 with outlet port 58, said port being connected by pipe 158 to fitting 64 to which pipe 14 is connected, for introducing pressure media beneath piston 12 for forcing it upwardly to expel the contents of cylinder 10 through the various nozzles 40.

When the valve actuating lever 62 has been shifted to the position indicated in dotted outline of Fig. 1, plug 60 will interconnect inlet port 52 with outlet port 54 which is connected through piping 154 to the inlet end of a venturi denoted generally by the numeral 66.

Port 58 will be simultaneously connected to discharge port 56 thereby exhausting the pressure media beneath the piston through pipe 156, T-fitting 68, pipe 70, check valve 72, T-fitting 74 into exhaust line 76 to the bottom of which a conventional muffler 78 is operatively secured.

The rate at which the pressure media is exhausted from beneath piston 12 will be accelerated by the suction induced in chamber 80 of the venturi, which chamber is in open communication with one leg of T-fitting 68 via pipe 82.

At this point it will be noted that the present invention is neither directed to nor concerned with the specific structural details of the air stuffer hereinabove described, said stuffer comprising a well-known commercially available device widely used in the meat-packing industry.

My safety attachment comprises a pressure relief valve 100 connected through suitable by-pass piping to fitting 64 as at 104. A valve 102 is interposed between relief valve 100 and fitting 64 for selectively isolating valve 100 from or connecting it in open communication with the by-pass and interior of cylinder 10 below piston 12 via pipe 14.

Valve 102 includes a handle 106 swingable between the fully elevated position indicated in solid outline in which position the pressure relief means 100 is in open communication with the interior of the cylinder, or to the fully lowered position indicated in broken outline for isolating the pressure relief means 100 from the interior of the cylinder.

A lever 108 is pivotally connected as at 110 relative to cylinder 10, wherein one end of the lever is secured relative to handle 106 by link 112.

The other end of lever 108 is pivotally secured as at 116 to a bolt 114 vertically reciprocable within an elongated sleeve 118 suitably fastened to the cylinder as at 120 and 122.

A collar denoted generally by the numeral 124 is fixedly secured to and carried by boss 20 from which it extends in a substantially horizontal plane for providing an overhanging edge or surface 126. Collar 124 is provided with a bolt receptive aperture or opening 128 which is so constructed and arranged as to be disposed in axial alignment with bolt 114 only when the yoke has been disclosed in the cover-closing position illustrated in Fig. 1.

From the foregoing it will be noted that upward axial movement of bolt 114 will be resisted by the lower surface 126 of collar 124 during those periods of time when the yoke has been turned about pivot bolt 22 for shifting the collar opening or aperture 128 out of axial alignment with bolt 114 for thereby automatically and positively preventing lowering of valve handle 106 for disconnecting or isolating the pressure relief means 100 from interior of cylinder 10.

It will be further noted that when the upper end of bolt 114 has been shifted upwardly through the collar opening or aperture 128 for permitting lowering of valve handle 106 to the position indicated in dotted outline, the upper end of bolt 114 will effectively and positively preclude relative motion between the yoke and cylinder by reason of its locking engagement with collar 124.

Highly satisfactory results have been obtained when pressure relief means 100 is of the type adapted to automatically release pressure in excess of five pounds per square inch. It has been observed that such an amount of pressure is quite adequate for normally elevating piston 12 during those periods of time when the yoke and cover 16 have been swung to a fully open position, and for enabling an operator to safely actuate piston 12 with the top of the stuffer removed.

It is the rule rather than the exception for the piston 12 of an air stuffer to become stuck relative to the inner side walls of cylinder 10, particularly after long periods of non-use. Many disastrous accidents have occurred in the past when full-line pressure has been applied to a stuffer cylinder during those periods of time when the cover was open for enabling the operator to free or loosen a temporarily stuck piston from the side walls of the cylinder.

With reference now to Figs. 4–8, it will be noted that axial motion is imparted to bolt 114 by means of cam 200 secured to and carried by an extension or stem 202 of rotatable plug 204 of valve 206 which includes a handle 208. The plane of rotation of the cam is in substantial vertical alignment with bolt 114, it being noted that the throw of the cam is sufficient to dispose the bolt in the lowered, fully retracted, non-interfering position illustrated in Figs. 4 and 5, or to a raised, fully elevated, collar-engaging position for locking the yoke against relative movement with the cylinder.

In the preferred embodiment of the invention valve 206 may be a three-way valve comprising an inlet port 210, and outlet ports 212 and 214. The inlet port may be suitably connected in open communication with the interior of cylinder 10 via pipe 216, fitting 64 and pipe 14.

When handle 208 has been positioned as illustrated in Figs. 4, 5 and 6, the interior of the relief valve 100 will be in direct open communication with the interior of the cylinder, port 212 being closed as illustrated in Fig. 6. When thus located, cam 200 will be positioned whereby bolt 114 is retracted, thereby enabling yoke 18 to be swingable in a horizontal plane relative to cylinder 10.

When handle 208 is in the position illustrated in Fig. 7, cam 200 will be positioned whereby to elevate bolt 114 into collar opening 128, thereby locking the yoke in closed position while simultaneously isolating the relief valve from the interior of the cylinder. It will be noted that handle 208 cannot be actuated to the position of Fig. 7 until and unless the yoke has been disposed in position for locating cover 16 in closed position in axial alignment with the open top of the cylinder, since only then will aperture 128 of collar 124 be disposed in axial alignment with the bolt.

Therefore, it will be noted that full-line pressure can be applied to the cylinder only when bolt 114 is fully elevated and valve 206 is closed as indicated in Fig. 7.

When the valve is disposed as illustrated in Fig. 8, the interior of the cylinder will be connected via pipe 216 to the relief valve 100 and to exhaust port 212, thereby effectively precluding the establishment of any pressure in the cylinder sufficient to actuate the piston.

From the foregoing, it will be noted that I have provided simple, highly effective, foolproof means for positively precluding the application of pressures in excess of those determined by pressure relief means 100 occurring within cylinder 10 during those periods of time when the yoke and cover are in positions other than in closed, axial alignment with the cylinder. It will be noted that the safety devices are so constructed and arranged as to positively withstand and resist their being rendered ineffective by an operator desiring to operate a stuffer without benefit of the safety attachment.

It should be understood that various modifications and changes may be made within the structural details of the device, within the scope of the appended claims, without departing from the spirit of the invention.

What is claimed is:

1. A fluid-pressure-operated stuffing machine comprising a cylinder open at its top, a yoke pivoted at one end to the casing for horizontal swinging movement into and out of position diametrically across the open upper end of the cylinder, a closure for said cylinder carried by said yoke and shiftable vertically from a lowered position in closing relation to the open top of the cylinder to a raised and opened position, a piston slidable vertically in said cylinder, a pipe structure including a pipe communicating with the lower portion of the cylinder for admitting fluid under pressure into the cylinder under the piston therein to shift the piston upwardly in a power stroke and also allow exhaust of said fluid from the cylinder under the piston during downward movement of the piston to its lowered position, a main valve controlling directional flow of fluid through the pipe structure and having an actuating handle for manual opening and closing of the valve, an auxiliary valve having an inlet communicating with the pipe structure between the main valve and its connection with the casing, a handle for said auxiliary valve, a pressure relief valve connected with the outlet of the auxiliary valve, a collar rigid with and extending about the pivoted end of said yoke and formed with a vertically extending opening, a guide carried by said cylinder, a bolt shiftable vertically through said guide and when raised having an upper end engaged in the opening in said collar and securing the yoke against swinging movement about its pivot out of a position diametrically across the cylinder, a lever pivotally mounted horizontally on said cylinder and having an end pivoted to the lower end of said bolt and shifting the bolt downwardly out of the opening in the collar and thereby allow movement of the yoke away from its position across the top of the cylinder when the lever is tilted in one direction, and a vertical link connecting the other end of the lever with the handle of the auxiliary valve and effecting tilting of the lever and downward movement of the bolt out of engagement with the collar when the handle of the auxiliary valve is moved in a direction to open the said auxiliary valve.

2. A fluid-pressure-operated stuffing machine comprising a cylinder open at its top, a yoke pivoted at one end to the casing for horizontal swinging movement into and out of position diametrically across the open upper end of the cylinder, a closure for said cylinder carried by said yoke and shiftable vertically into and out of position to close the upper end of the cylinder, a piston slidable vertically in said cylinder, a pipe structure including a pipe communicating with the bottom portion of the cylinder for admitting fluid under pressure into the cylinder below the piston to impart upward movement to the piston and also allow exhaust of said fluid from the cylinder during return of the piston to its lowered position, a main valve controlling directional flow of fluid through said pipe structure, an auxiliary valve having an inlet communicating with the said pipe of the said pipe structure between the main valve and its connection with the bottom portion of the cylinder, a handle for said auxiliary valve, a pressure relief valve connected with the outlet of the auxiliary valve, a collar about the pivoted end of said yoke formed with an opening, a guide carried by said cylinder below the pivoted end of said yoke, a bolt slidable vertically through the guide and when raised having an upper end engaged in the opening of said collar and thereby securing the yoke against swinging movement about its pivot out of a position diametrically across the cylinder, said auxiliary valve being located under said bolt and having a rotatable stem with which its handle is connected, and a cam carried by the stem and engaging the lower end of the bolt and shifting the bolt vertically when the stem is turned to open and close the manually operated valve.

3. A fluid-pressure-operated stuffing machine comprising a cylinder open at its top, a yoke pivoted at one end to the casing for horizontal swinging movement into and out of position diametrically across the open upper end of the cylinder, a closure for said cylinder carried by said yoke and movable vertically into and out of a closed position, a piston slidable vertically in said cylinder, a pipe structure including a pipe communicating with the bottom portion of the cylinder for admitting fluid under pressure into the cylinder under the piston to impart an upward power stroke to the piston, a main valve in said pipe structure to control flow of fluid into the cylinder and also control exhaust of said fluid from the cylinder through the pipe structure during return of the piston to its normal position, an auxiliary valve having an inlet communicating with the pipe structure between the main valve and the connection of the pipe structure with the cylinder, a handle for said auxiliary valve, a pressure relief valve connected with the outlet of the auxiliary valve, a collar about the pivoted end of said yoke and provided with an opening, a bolt slidable vertically under said collar and when raised having its upper end engaged in the opening of said collar and thereby securing the yoke against swinging movement out of a position diametrically across the cylinder, and means movable by the auxiliary valve and engaged with the bolt for raising and lowering of the bolt during closing and opening of the said auxiliary valve.

CARL OSCAR SCHMIDT, Jr.

References Cited in the file of this patent

UNITED STATES PATENTS

| Number | Name | Date |
|---|---|---|
| 1,234,935 | Peterson | July 31, 1917 |
| 1,444,064 | Deacon | Feb. 6, 1923 |
| 1,470,371 | Ahrens | Oct. 9, 1923 |
| 1,647,752 | Schmidt | Nov. 1, 1927 |
| 2,309,345 | Hunn et al. | Jan. 26, 1943 |
| 2,372,753 | Watson | Apr. 3, 1945 |